P. L. JOHNSON.
CONVERTIBLE STREET CAR.
APPLICATION FILED MAR. 16, 1911.
1,011,802.
Patented Dec. 12, 1911.
4 SHEETS—SHEET 1.
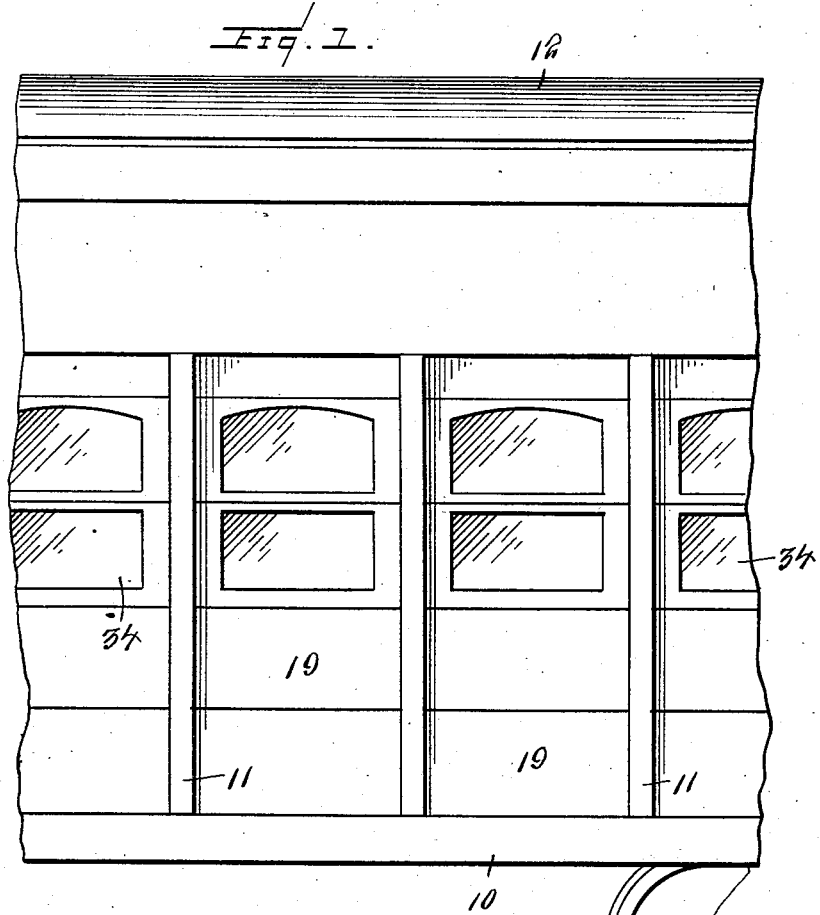
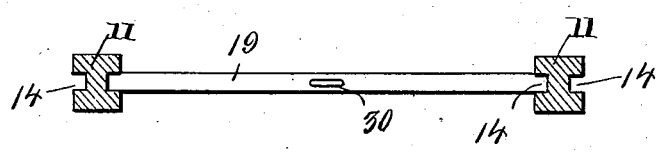
Inventor
P. L. Johnson
Witnesses
By Victor J. Evans
Attorney

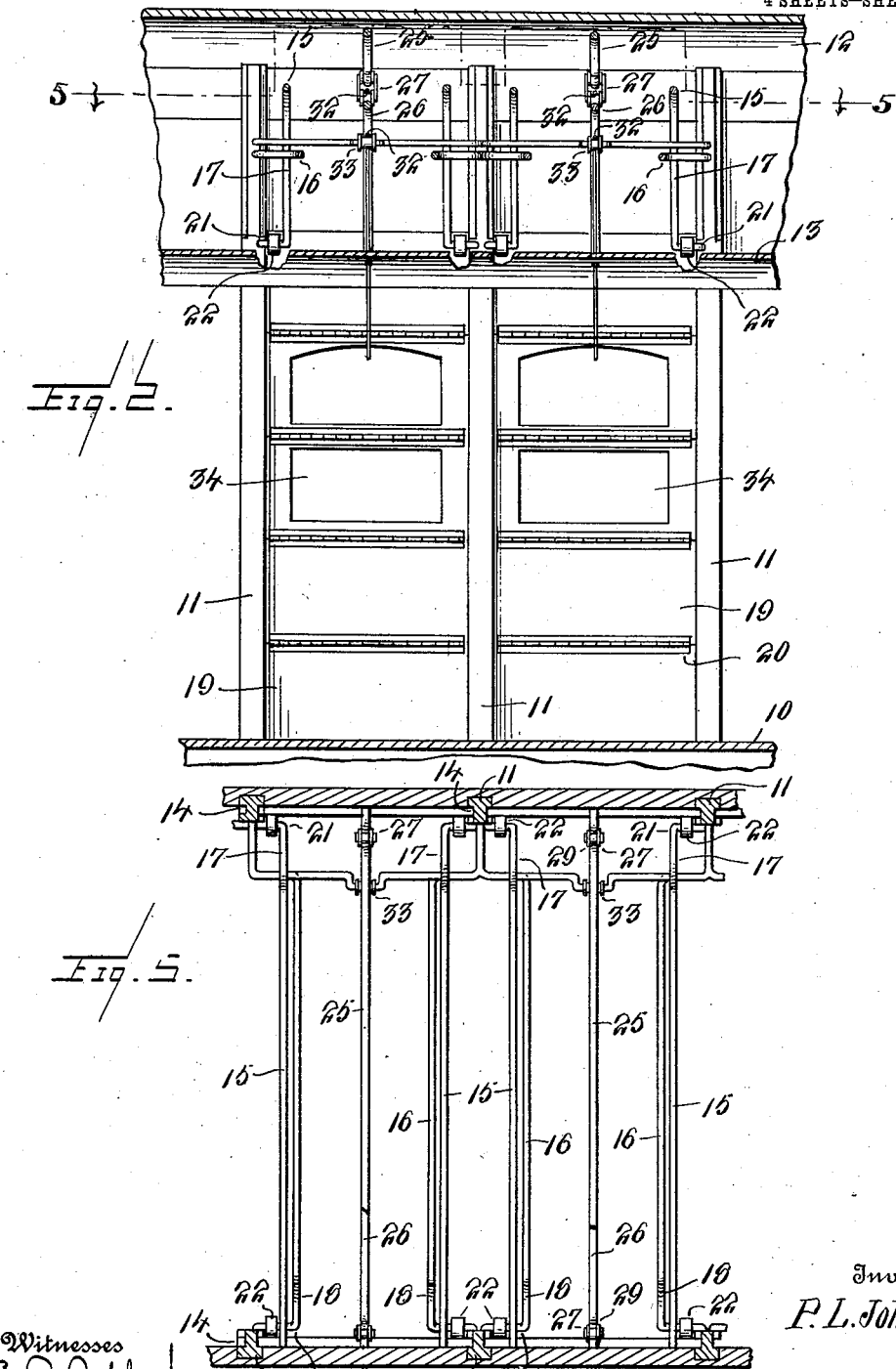

P. L. JOHNSON.
CONVERTIBLE STREET CAR.
APPLICATION FILED MAR. 16, 1911.
1,011,802.
Patented Dec. 12, 1911.
4 SHEETS—SHEET 3.
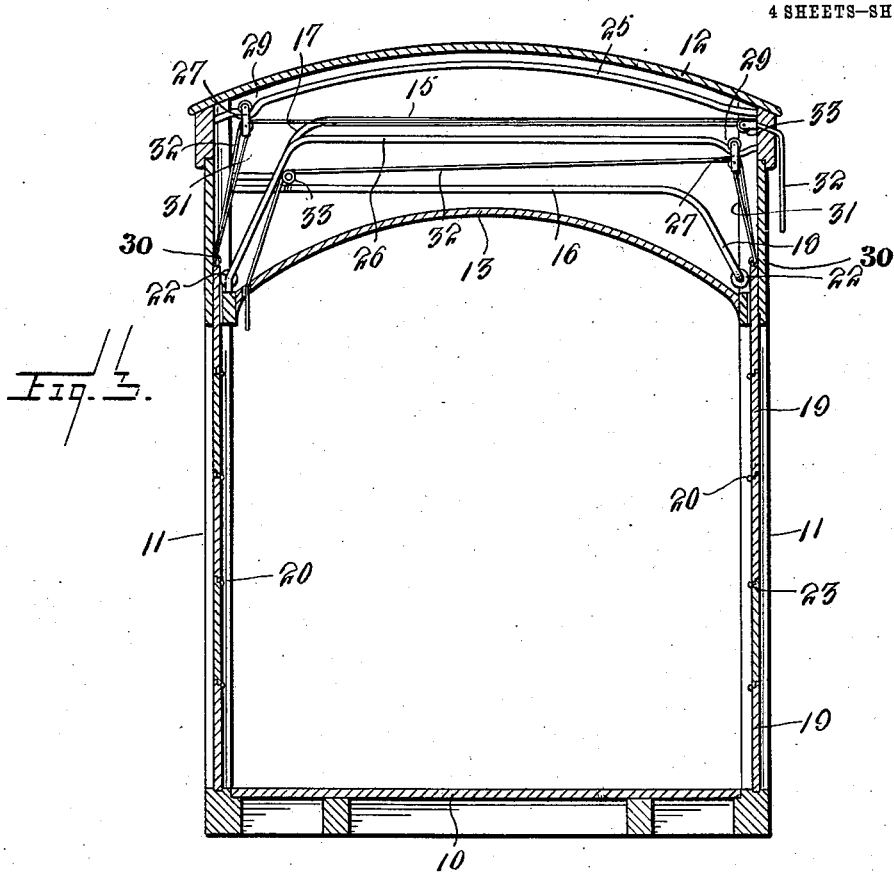
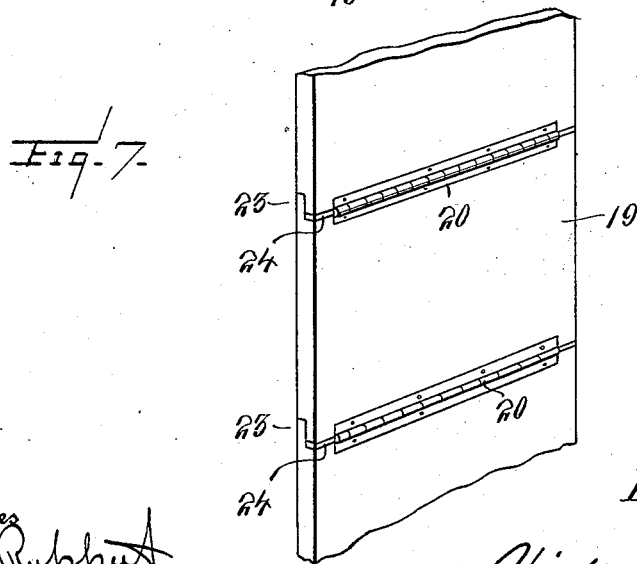
Witnesses
E. R. Ruppert
Inventor
P. L. Johnson
By Victor J. Evans
Attorney P. L. JOHNSON.
CONVERTIBLE STREET CAR.
APPLICATION FILED MAR. 16, 1911.
1,011,802.
Patented Dec. 12, 1911.
4 SHEETS—SHEET 4.
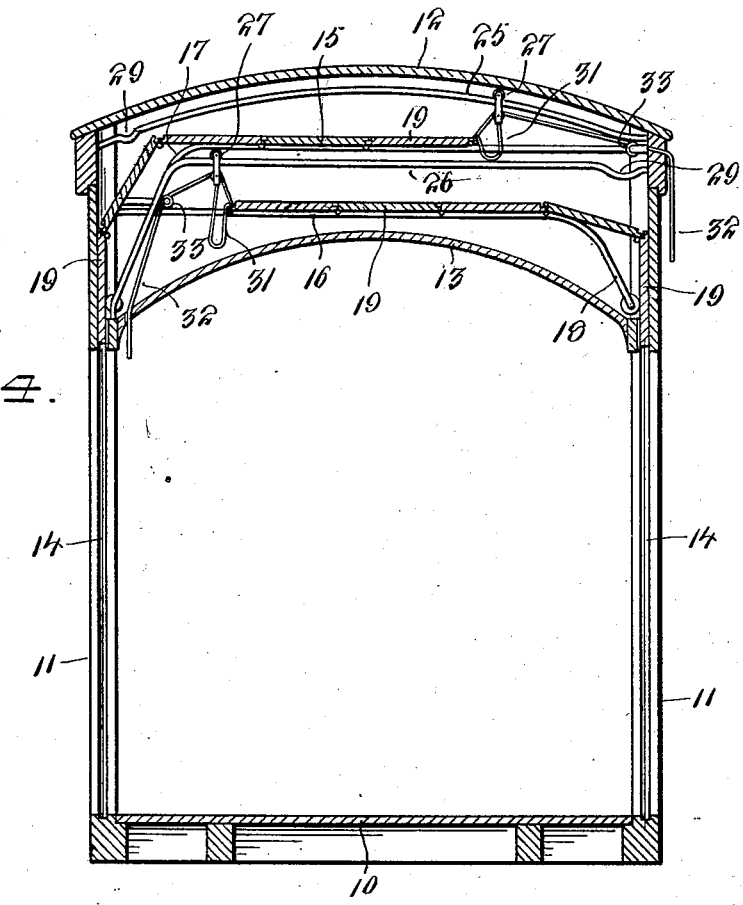
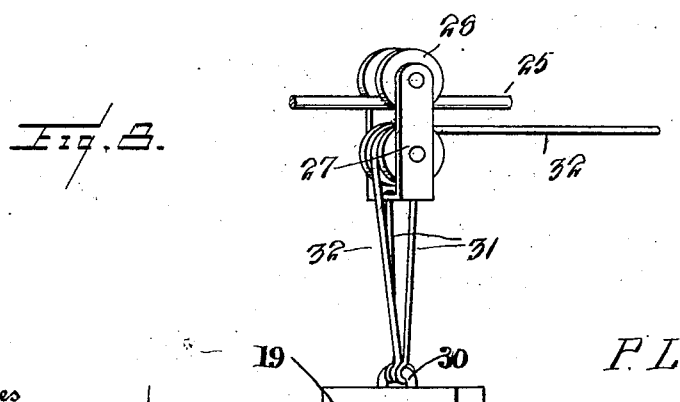
Inventor
P. L. Johnson
By Victor J. Evans
Attorney
Witnesses

UNITED STATES PATENT OFFICE.

PRESTON L. JOHNSON, OF CROSSNORE, NORTH CAROLINA.

CONVERTIBLE STREET-CAR.

1,011,802.  Specification of Letters Patent.  Patented Dec. 12, 1911.

Application filed March 16, 1911. Serial No. 614,804.

*To all whom it may concern:*

Be it known that I, PRESTON L. JOHNSON, a citizen of the United States, residing at Crossnore, in the county of Mitchell and State of North Carolina, have invented new and useful Improvements in Convertible Street-Cars, of which the following is a specification.

The invention relates to cars, and more particularly to the class of convertible street cars.

The primary object of the invention is the provision of a car in which the sides thereof are formed of slidable sections, whereby the car may be converted into either an open or closed car for summer and winter use, respectively.

Another object of the invention is the provision of a car of this character in which the side sections of the car body are hinged together, so that the said sections may be shifted for the closing or opening of the car body, whereby the latter may be used either as a winter or summer car, the sections being traversable in guide-ways, and upon tracks formed in the car body, so that the sections may be shifted without binding thereof, and with the least possible friction.

A further object of the invention is the provision of a car of this character which is simple of construction, strong, durable, capable of being readily and quickly converted into either an opened summer car or a closed winter car, and that may be manufactured at a minimum expense.

With these and other objects in view, the invention consists in the construction, combination and arrangement of parts, as will be hereinafter more fully described, illustrated in the accompanying drawings, and pointed out in the claims hereunto appended.

In the drawings, accompanying and forming part of this specification, is illustrated the preferred form of embodiment of the invention, which, to enable those skilled in the art to carry the invention into practice, will be set forth at length in the following detail description, while the novelty of the invention will be pointed out in the claims hereunto appended. However, it is to be understood that changes, variations, and modifications may be made in the car structure, such as come properly within the scope of the appended claims, without departing from the spirit of the invention, or sacrificing any of its advantages.

In the drawings: Figure 1 is a fragmentary side elevation of a car constructed in accordance with the invention, the side sections being in lowered position. Fig. 2 is a fragmentary vertical longitudinal sectional view through the car. Fig. 3 is a vertical transverse sectional view thereof. Fig. 4 is a similar view, showing the side sections in raised position. Fig. 5 is a fragmentary horizontal sectional view on the line 5—5 of Fig. 2. Fig. 6 is an enlarged horizontal sectional view through one side of the car. Fig. 7 is a fragmentary perspective view of adjacent hinged side sections. Fig. 8 is a perspective view of one of the shiftable pulley blocks.

Similar reference characters indicate corresponding parts throughout the several views of the drawings.

Referring to the drawings by numerals, the car body comprises a platform or flooring 10, from which rise stanchions 11, the same supporting a roof 12, and also an inner ceiling or head lining 13, it being understood, of course, that the car body may be of any desirable size, and may be constructed from any suitable material. The space between the roof 12 and the ceiling 13 may be designated at a storing compartment for receiving the side panels or sections of the car body, in a manner as will be hereinafter more fully described.

The opposite faces of the stanchions 11 are provided with rabbeted portions forming guide grooves 14, the same extending throughout the length thereof, the upper ends of each stanchion 11 being cut away, whereby the grooves 14 at their upper ends will open interiorly of the car body. Arranged within the space between the roof 12 and the ceiling 13, transversely thereof, are superposed or spaced upper and lower pairs of guide rails 15 and 16, respectively. The upper guide rails 15 are provided with alining curvatures 17, and likewise the lower guide rails 16 are provided with alining curvatures 18 on the side of the car body opposite the curvatures 17 in the said upper guide rails. These upper and lower guide rails 15 and 16, at their ends, are fixed in opposite stanchions 11 in a rigid manner, so as to sustain the weight of the side sections of the car body when moved onto or traversing the same, as will be hereinafter more fully described.

Slidably fitted within the guide grooves 14 in the stanchions 11, at opposite sides of the car body, are shiftable side panels or sections 19, the same at each side of the car body and between the stanchions 11 being connected together by means of hinges 20, so that on the raising and lowering of the sections or panels 19, the hinges 20 will permit them to swing to the proper angle when passing onto and from the upper and lower guide rails 15 and 16, the latter being provided at their lowermost ends with offset portions 21, on which are journaled friction rollers 22, contacting with the inner faces of the panels or sections 19, thus preventing the binding thereof during the shifting of the same to and from the space between the roof 12 and the ceiling 13 of the car body. The contiguous edges of the side panels or sections 19 are suitably rabbeted to form overlapping or interlocking extensions 23, one extension on each panel or section 19 being faced with a felt strip 24. Thus, when the sections have been brought to lowered position at opposite sides of the car, the felt strips will serve to form waterproof joints between the panels or sections, so as to exclude dust, rain, snow or the like from the interior of the car body.

Disposed centrally between the pairs of upper and lower guide rails 15 and 16 are suitable pulley guide tracks 25 and 26, respectively, the ends of which are secured to the frame of the car body, whereby the said tracks will lie in the space between the roof 12 and the ceiling 13 of the said car body, and on which are movably mounted pulley blocks 27, each having in its upper end a guide roller 28 traversable upon the tracks. Each track, at one end thereof, is formed with a bend 29, forming a bearing seat, so as to receive the roller 28 of the pulley block and prevent displacement thereof when the side sections or panels 19 are in lowered position. Fixed to the pulley blocks 27 and to staple members 30 mounted in the uppermost side sections are tie cables 31, so that the said sections will be flexibly connected with the pulley block 27 on the tracks 25 and 26. The side sections or panels 19 may be shifted onto the guide rails 25 and 26 for the storing of the sections or panels in the space between the roof and ceiling of the car body in a manner presently described.

Fixed to the staples 30 and trained through the pulley blocks 27 are hoisting cables 32 which permit the convenient raising and lowering of the side sections or panels 19 for the opening and closing of the opposite sides of the car body. These lifting cables 32 may be manually or otherwise actuated for the raising and lowering of the side sections or panels of the car body.

Fixed to the opposite sides of the frame of the car body, below the guide tracks 25 and 26, are guide pulleys 33, over which are trained the lifting cables 32, for the proper working thereof. The uppermost side sections or panels 19 are provided with the usual window sashes 34, the same being mounted in suitable window casements formed in the said panels or sections. The manner as raising the said sections or panels 19 is as follows: Assuming that the side sections or panels 19 are in closed position, thereby closing the body for its use as a winter car, and it is desired to convert the same into an open, or what is commonly termed a summer car, it is only necessary to pull upon the lifting cables 32, thereby raising the hinge connected side sections or panels 19 in the grooves 14 in the stanchions 11, and when the said panels or sections 19 have been raised to a predetermined point, the pulley blocks 27 are shifted on the tracks 25 and 26 from their normal seats 29. Thus the said side panels or sections 19 will be moved onto the guide rails 15 and 16 in the compartment between the roof 12 and the ceiling 13 of the car body, thereby concealing the said side sections or panels from view, and opening the car body for its use as a summer car. In the lowering of the side sections, it is only necessary to pull upon suitable straps or other devices (not shown) connected to the lowermost sections 19, whereupon the said sections, upon a downward pull thereon, may be brought to closed position.

It is deemed needless to explain the manner of changing the car to what is ordinarily termed a winter car or a closed one, as the operation accomplishing this is clearly obvious.

Having thus described the invention what I claim is:—

1. A car of the class described comprising a frame structure having vertical stanchions provided with guide grooves therein, guide rails connected with the stanchions and extending across the frame near the top thereof, side sections slidably engaged in the guide grooves and adapted to be raised on to the guide rails, means hinging the side sections adjacent each other and mechanism for raising the side sections at each side of the frame.

2. A car of the class described comprising a frame structure having vertical stanchions provided with guide grooves therein, guide rails connected with the stanchions and extending across the frame near the top thereof, side sections slidably engaged in the guide grooves and adapted to be raised on to the guide rails, means hinging the side sections adjacent each other and mechanism for raising the side sections at each side of the frame, and friction rollers carried by the guide rails and engageable with the side sections.

3. A car of the class described comprising a frame structure having vertical stanchions provided with guide grooves therein, guide rails connected with the stanchions and extending across the frame near the top thereof, side sections slidably engaged in the guide grooves and adapted to be raised on to the guide rails, means hinging the side sections adjacent each other, mechanism for raising the side sections at each side of the frame, friction rollers carried by the guide rails and engageable with the side sections, pulley guide tracks affixed to the frame above the guide rails and intermediate the same, and guide pulleys working upon said guide tracks and supporting said mechanism.

4. A car of the class described comprising a frame structure having vertical stanchions provided with guide grooves therein, guide rails connected with the stanchions and extending across the frame near the top thereof, side sections slidably engaged in the guide grooves and adapted to be raised on to the guide rails, means hinging the side sections adjacent each other, mechanism for raising the side sections at each side of the frame, friction rollers carried by the guide rails and engageable with the side sections, pulley guide tracks affixed to the frame above the guide rails, and intermediate the same, and guide pulleys working upon said guide tracks and supporting said mechanism, and means interposed between the side sections for forming tight joints there-between.

In testimony whereof I affix my signature in presence of two witnesses.

P. L. JOHNSON.

Witnesses:
J. L. PARSONS,
BURGAIN BURLESON.